(12) United States Patent
Zhang et al.

(10) Patent No.: US 9,947,992 B2
(45) Date of Patent: Apr. 17, 2018

(54) MOBILE TERMINAL WITH NEW TYPE OF ANTENNA STRUCTURE

(71) Applicant: Huawei Device (Dongguan) Co., Ltd., Dongguan (CN)

(72) Inventors: Xuefei Zhang, Shenzhen (CN); Yibo Chen, Xi'an (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 51 days.

(21) Appl. No.: 15/025,883

(22) PCT Filed: Nov. 28, 2013

(86) PCT No.: PCT/CN2013/088026
§ 371 (c)(1),
(2) Date: Mar. 29, 2016

(87) PCT Pub. No.: WO2015/077956
PCT Pub. Date: Jun. 4, 2015

(65) Prior Publication Data
US 2016/0248147 A1     Aug. 25, 2016

(51) Int. Cl.
H01Q 1/24      (2006.01)
H01Q 1/48      (2006.01)
H01Q 9/04      (2006.01)
H01Q 5/378     (2015.01)
H01Q 9/16      (2006.01)

(52) U.S. Cl.
CPC .......... *H01Q 1/243* (2013.01); *H01Q 1/48* (2013.01); *H01Q 5/378* (2015.01); *H01Q 9/0421* (2013.01); *H01Q 9/16* (2013.01)

(58) Field of Classification Search
USPC .................................. 343/841, 702
See application file for complete search history.

(56) References Cited

U.S. PATENT DOCUMENTS 7,551,142 B1 * 6/2009 Zhang ................. H01Q 1/243
343/700 MS
2005/0253757 A1  11/2005 Liu et al.
(Continued)

FOREIGN PATENT DOCUMENTS

CN       2865031 Y     1/2007
CN     102074803 A     5/2011
(Continued)

OTHER PUBLICATIONS

Foreign Communication From a Counterpart Application, European Application No. 13898147.7, Extended European Search Report dated Aug. 3, 2016, 8 pages.
(Continued)

Primary Examiner — Jessica Han
Assistant Examiner — Hai Tran
(74) Attorney, Agent, or Firm — Conley Rose, P.C.

(57) ABSTRACT

A mobile terminal with a antenna structure applicable to the field of communications equipment technologies, where the antenna structure includes a metal rear cover, a first slot which is disposed on the metal rear cover, and connects with the metal rear cover through one end, a second slot and a third slot which are disposed on the metal rear cover, and located on opposite sides of the first slot, and connects with the first slot through one end, and the metal rear cover includes a rear cover which is located on one side of the second slot and the third slot, and an antenna part located on the other side of the second slot and the third slot, and the antenna part includes a first antenna part located on one side of the first slot and a second antenna part located on the other side of the first slot.

13 Claims, 9 Drawing Sheets

(56) References Cited

U.S. PATENT DOCUMENTS

| | | |
|---|---|---|
| 2009/0184874 A1 | 7/2009 | Chi et al. |
| 2011/0181477 A1 | 7/2011 | Rietzler et al. |
| 2012/0068905 A1* | 3/2012 | Ayatollahi ............. H01Q 1/243 |
| | | 343/841 |
| 2012/0218723 A1 | 8/2012 | Kwak et al. |
| 2013/0257662 A1 | 10/2013 | Eom et al. |
| 2014/0300517 A1 | 10/2014 | Onaka et al. |

FOREIGN PATENT DOCUMENTS

| | | |
|---|---|---|
| CN | 102185174 A | 9/2011 |
| CN | 102368575 A | 3/2012 |
| CN | 102469184 A | 5/2012 |
| CN | 102710817 A | 10/2012 |
| CN | 103022689 A | 4/2013 |
| CN | 103367914 A | 10/2013 |
| EP | 1437794 A1 | 7/2004 |
| EP | 2117074 A1 | 11/2009 |
| JP | 1987034407 A | 2/1987 |
| JP | 3886932 B2 | 12/2006 |
| JP | 2012039596 A | 2/2012 |
| JP | 2012085262 A | 4/2012 |
| WO | 2011018551 A1 | 2/2011 |
| WO | 2013077302 A1 | 5/2013 |

OTHER PUBLICATIONS

Machine Translation and Abstract of Japanese Publication No. JP2012085262, Apr. 26, 2012, 28 pages.
Machine Translation and Abstract of Chinese Publication No. CN2865031, Jan. 31, 2007, 4 pages.
Foreign Communication From a Counterpart Application, Chinese Application No. 201380077812.X, Chinese Office Action dated Mar. 2, 2017, 8 pages.
Foreign Communication From a Counterpart Application, Chinese Application No. 2016-539391, Chinese Office Action dated Feb. 21, 2016, 3 pages.
Foreign Communication From a Counterpart Application, Chinese Application No. 2016-539391, English Translation of Chinese Office Action dated Feb. 21, 2016, 3 pages.
Partial English Translation and Abstract of Chinese Patent Application No. CN102368575, Part 1, Mar. 1, 2016, 4 pages.
Partial English Translation and Abstract of Chinese Patent Application No. CN102368575, Part 2, Mar. 1, 2016, 2 pages.
Foreign Communication From a Counterpart Application, PCT Application No. PCT/CN2013/088026, English Translation of International Search Report dated Jul. 8, 2014, 2 pages.
Foreign Communication From a Counterpart Application, PCT Application No. PCT/CN2013/088026, English Translation of Written Opinion dated Jul. 8, 2014, 8 pages.
Machine Translation and Abstract of Japanese Publication No. JPS62034407, Feb. 14, 1987, 10 pages.
Foreign Communication From a Counterpart Application, Japanese Application No. 2016-539391, Japanese Notice of Allowance dated Jun. 6, 2017, 3 pages.
Machine Translation and Abstract of Chinese Publication No. CN103022689, Apr. 3, 2013, 7 pages.
Foreign Communication From A Counterpart Application, Chinese Application No. 201380077812.X, Chinese Office Action dated Oct. 24, 2017, 8 pages.

* cited by examiner

# MOBILE TERMINAL WITH NEW TYPE OF ANTENNA STRUCTURE

CROSS-REFERENCE TO RELATED APPLICATIONS

This application is a National Stage of International Application No. PCT/CN2013/088026, filed on Nov. 28, 2013, which is hereby incorporated by reference in its entirety.

TECHNICAL FIELD

The present disclosure relates to the field of communications equipment technologies, and in particular, to a mobile terminal with a new type of antenna structure.

BACKGROUND

To enhance the quality perception of a mobile terminal (such as a mobile phone or a tablet), metal is increasingly applied to industrial design of mobile terminals. Such industrial design significantly affects antenna performance. Using a mobile phone as an example, wireless communication is a mandatory function of the mobile phone, and an antenna is a mandatory component of the mobile phone. The level of antenna performance is also important to multiple aspects, for example, whether call quality is good and whether a data service is smooth. In industrial design with various metal materials, design of an antenna with a metal rear cover is the most challenging. A rear cover is a rear housing of a mobile terminal. A metal rear cover is a metal rear housing.

As shown in FIG. 1, a technical solution in the prior art is that a metal rear cover is fully split into three parts or at least two parts, and adjacent parts are fully separated by a gap 10'. By setting a width of the gap 10' to a relatively small value, a shape of the metal rear cover can be well ensured. Then one part of metal 11' obtained by splitting directly serves as a part of the antenna. The gap 10' may be filled with a bond that is used to bond all parts of the metal rear cover into an entirety. As described above, radiation of the antenna requires an open environment. If the part separated from the metal rear cover is used as a part of the antenna, the outside of the metal rear cover is air. Due to the electrical characteristics of air, air is also an open medium to the antenna. Therefore, the antenna is free from a problem that the open environment is damaged. However, a tail end of the antenna (or called an opening end of the gap 10') is generally on a lateral edge of the mobile phone, and the gap 10' tends to be held by a hand of a user. Once this place is held by a hand, an operating resonance of the antenna is deviated massively, and performance is deteriorated as a result. In an antenna reflection coefficient test diagram shown in FIG. 2, an operating frequency of an antenna is deviated by hundreds of megahertz (MHz) depending on presence of a finger, which indicates great impact and leads to a poor communication effect of the mobile phone.

SUMMARY

The present disclosure aims to overcome the disadvantages of the prior art, and provides a mobile terminal with a new type of antenna structure, where the mobile terminal provides good antenna performance and a great communications effect.

According to a first aspect, the present disclosure provides a mobile terminal with a new type of antenna structure, including an antenna structure, where the antenna structure includes a metal rear cover, a first slot is disposed on the metal rear cover, and one end of the first slot connects with a lateral face or an end face of the metal rear cover, a second slot and a third slot are further disposed on the metal rear cover, the second slot is located on one side of the first slot, one end of the second slot connects with the first slot, the third slot is located on the other side of the first slot, and one end of the third slot connects with the first slot. The metal rear cover includes a rear cover located on one side of the second slot and the third slot and an antenna part located on the other side of the second slot and the third slot, the antenna part includes a first antenna part located on one side of the first slot and a second antenna part located on the other side of the first slot, and both the first antenna part and the second antenna part are integrally connected to the rear cover, and the antenna structure further includes an antenna feed point disposed on the first antenna part and/or the second antenna part, where the antenna feed point is connected to a transceiver of the mobile terminal using a feeder.

With reference to the first aspect, in a first possible implementation manner, an antenna extension part is connected to the first antenna part.

With reference to the first possible implementation manner of the first aspect, in a second possible implementation manner, the first antenna part is connected to the antenna extension part using a spring plate or an elastic ejector pin.

With reference to the first possible implementation manner of the first aspect, in a third possible implementation manner, the antenna feed point is disposed on the first antenna part, and one end of the antenna extension part is connected to the first antenna part.

With reference to the third possible implementation manner of the first aspect, in a fourth possible implementation manner, the antenna extension part is connected to a conductor inside the mobile terminal.

With reference to any possible implementation manner of the first aspect, in a fifth possible implementation manner, one end of the first slot connects with a bottom of the metal rear cover.

With reference to any possible implementation manner of the first aspect, in a sixth possible implementation manner, the first slot, the second slot, and the third slot form a T-shaped slot.

With reference to any possible implementation manner of the first aspect, in a seventh possible implementation manner, outline dimensions of the rear cover are greater than outline dimensions of the first antenna part and outline dimensions of the second antenna part.

With reference to any possible implementation manner of the first aspect, in an eighth possible implementation manner, the first antenna part has a connection point near the first slot, one end of the antenna extension part is connected to the connection point, the antenna extension part includes a first extension part that extends in a direction of the rear cover, a second extension part that extends in a direction leaving the first slot from a tail end of the first extension part, a third extension part that extends in a direction opposite to the rear cover from a tail end of the second extension part, and a fourth extension part that extends in a direction approaching the first slot from a tail end of the third extension part.

With reference to the eighth possible implementation manner of the first aspect, in a ninth possible implementation manner, a path from the first antenna part and the connection point to the antenna extension part is a first antenna path, a path from a joint between the second antenna part and the rear cover to an opposite direction of the rear cover and a direction of the first slot is a second antenna path, and a fundamental mode and a higher order mode of the first path form a low-frequency resonance and a first high-frequency resonance respectively, and space coupling exists between the second antenna path and the first antenna path and the second antenna path is excited to form a second high-frequency resonance.

According to the mobile terminal with a new type of antenna structure provided in the present disclosure, a first slot, a second slot, and a third slot are disposed on a metal rear cover, where the first slot, the second slot, and the third slot separate the metal rear cover into a first antenna part, a second antenna part, and a rear cover, so that appearance design for a full-metal rear cover of a mobile phone can be well maintained, and further, antenna performance can be ensured, high-frequency bandwidth can be expanded, and an extent of antenna performance deterioration caused by a user's hand holding can be reduced. This helps improve a communication effect of an antenna, and meanwhile may also reduce a difficulty of antenna commissioning, thereby reducing production costs.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

It should be noted that when a component is "fixed" or "disposed" on another component, the component may be placed on the another component directly or an intermediate component may exist. When a component is "connected" to another component, the component may be connected to the another component directly or an intermediate component may exist.

It should further be noted that orientation terms such as left, right, upper, and lower in the embodiments are merely relative concepts, or a normal use state of a product is used as a reference, but the terms should not be considered as restrictive.

Figure 1:
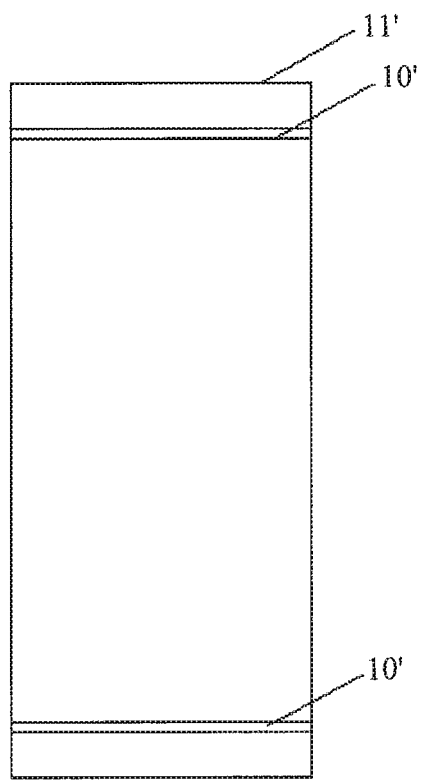
FIG. 1 is a planar schematic diagram of an antenna structure provided in the prior art.
Figure 2:
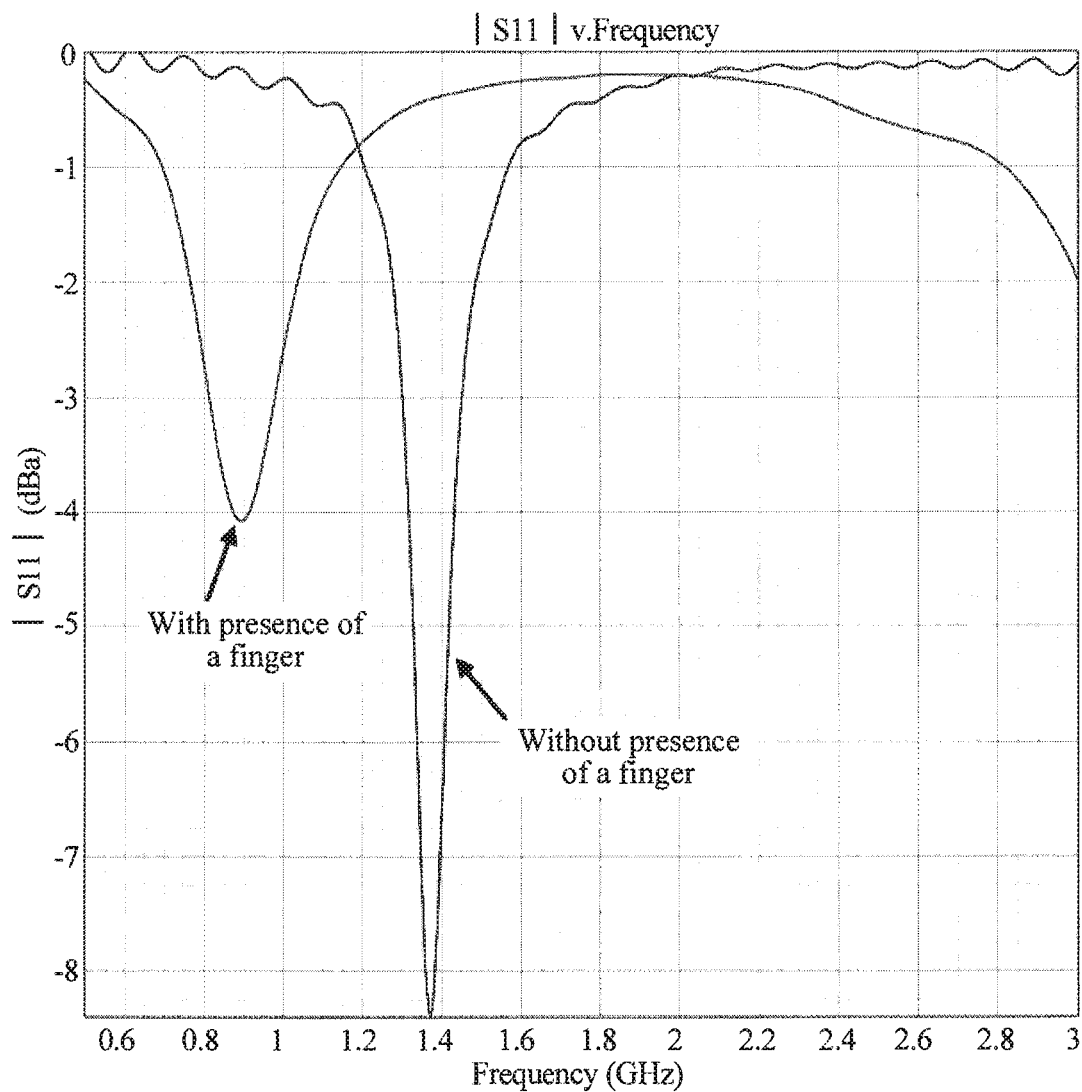
FIG. 2 is a test diagram of an antenna reflection coefficient of an antenna structure provided in the prior art.
Figure 3:
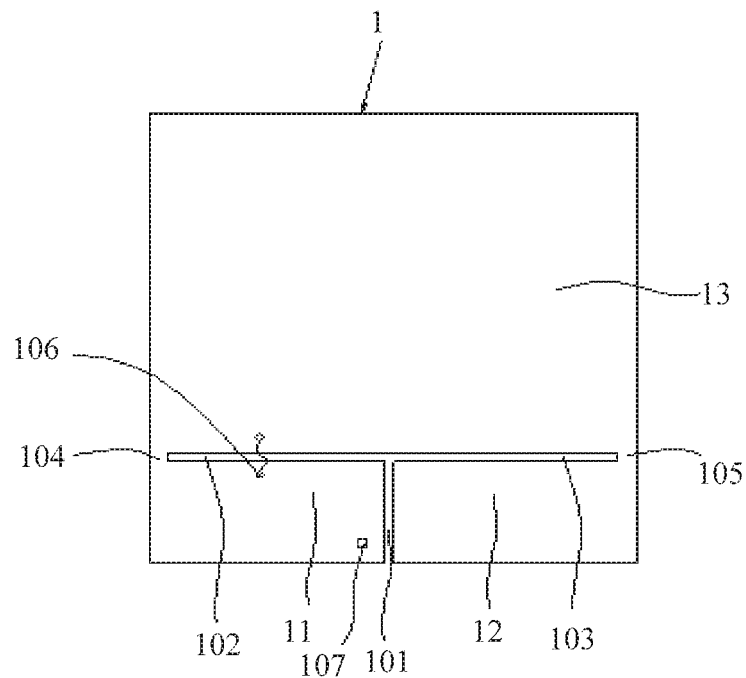
FIG. 3 is a planar schematic diagram of a mobile terminal according to an embodiment of the present disclosure.
Figure 4:
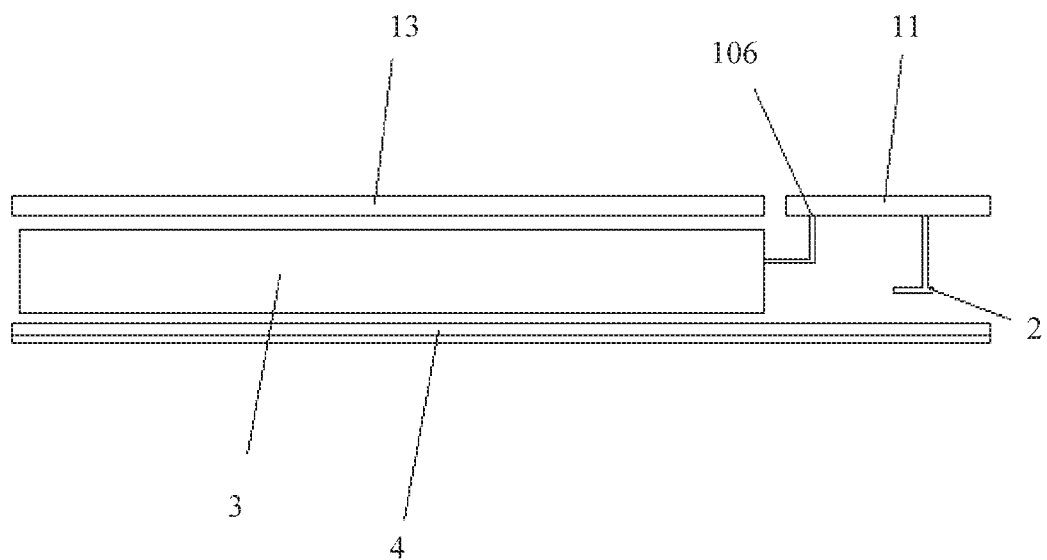
FIG. 4 is a lateral schematic diagram of a mobile terminal according to an embodiment of the present disclosure.

As shown in FIG. 3 and FIG. 4, a mobile terminal with a new type of antenna structure is provided in an embodiment of the present disclosure, where the mobile terminal may be a mobile phone, a tablet, or the like. In this embodiment, a mobile phone is used as an example. The mobile terminal with a new type of antenna structure includes an antenna structure, where the antenna structure includes a metal rear cover 1, and the metal rear cover 1 may be used as a rear housing of the mobile terminal and may also be used as a main part of the antenna structure. The metal rear cover 1 may be made of a metal material and formed integrally. A first slot 101 is disposed on the metal rear cover 1, and one end of the first slot 101 connects with a lateral face or an end face of the metal rear cover 1. A second slot 102 and a third slot 103 are further disposed on the metal rear cover 1, the second slot 102 is located on one side of the first slot 101, one end of the second slot 102 connects with the first slot 101, the third slot 103 is located on the other side of the first slot 101, and one end of the third slot 103 connects with the first slot 101. The second slot 102 and the third slot 103 are disposed on two sides of the first slot 101 respectively and both connect with the first slot 101. The other ends of the second slot 102 and the third slot 103 are both disposed apart from an edge of the metal rear cover 1. That is, the metal rear cover 1 is not fully separated by the slots, and the entire metal rear cover 1 is still a whole structure. In this embodiment, the other ends of the second slot 102 and the third slot 103 may be both close to the edge of the metal rear cover 1. The metal rear cover 1 includes a rear cover 13 located on one side of the second slot 102 and the third slot 103 and an antenna part located on the other side of the second slot 102 and the third slot 103, the antenna part includes a first antenna part 11 located on one side of the first slot 101 and a second antenna part 12 located on the other side of the first slot 101, and both the first antenna part 11 and the second antenna part 12 are integrally connected to the rear cover 13. The antenna structure further includes an antenna feed point 106 disposed on the first antenna part 11 and/or the second antenna part 12. The antenna feed point 106 may be connected to a transceiver (also called a signal transceiver module) in the mobile terminal by using a feeder to form a radio frequency system used for network communication. Such design implements full-metal rear cover structure design, produces an aesthetic product appearance, a great effect of heat dissipation, and high structural reliability. In addition, design of the first slot 101, the second slot 102, and the third slot 103 separates the metal rear cover 1 that is used as a rear housing of the product into the rear cover 13, the first antenna part 11, and the second antenna part 12.

Although a majority of areas between the rear cover 13, the first antenna part 11, and the second antenna part 12 is separated by the slots, the rear cover 13, the first antenna part 11, and the second antenna part 12 are still connected integrally, which significantly enhances structural reliability of a device in contrast with a discrete state characterized by full separation. In addition, a processing manner of the product is simple and requires only slotting, without requiring processes of bonding and jointing, which leads to low costs of the product. The rear cover 13 has a relatively large area, and may be used as a ground of the first antenna part 11 and the second antenna part 12. Based on principles of a slot antenna (inverted F-shape antenna (IFA), which is one of typical forms of electronically small antennas), antenna design may be performed for the first antenna part 11 and the second antenna part 12 that are integrally connected to the rear cover 13. A joint 104 between the first antenna part 11 and the rear cover 13 and a joint 105 between the second antenna part 12 and the rear cover 13 may be used as a ground point of the antenna. An antenna feed point 106 (also called a feed point) may be disposed on the first antenna part 11 to excite the antenna, which can ensure performance of the antenna. In addition, because a slotting direction of the first slot 101 is flexible, an opening of the first slot 101 may be located at a bottom or an upside of the mobile terminal, and is not vulnerable to touch by a user in a use process, which avoids massive offset of an operating resonance of the antenna and ensures antenna performance and a communication effect. In addition, the slotting manner on the metal rear cover 1 does not separate the metal rear cover 1, which can effectively expand antenna bandwidth of a high frequency band.

Furthermore, as shown in FIG. 3 and FIG. 4, one end of the first slot 101 connects with the bottom of the mobile terminal. For example, the first slot 101 may also connect with a corner at the bottom of the mobile terminal. In this embodiment, the first slot 101 connects with a bottom end face of the mobile terminal, and an opening end of a gap is located at the bottom of the metal rear cover 1, which significantly reduces a probability of being held by a hand, thereby reducing impact caused by the user's hand onto antenna performance.

Figure 10:
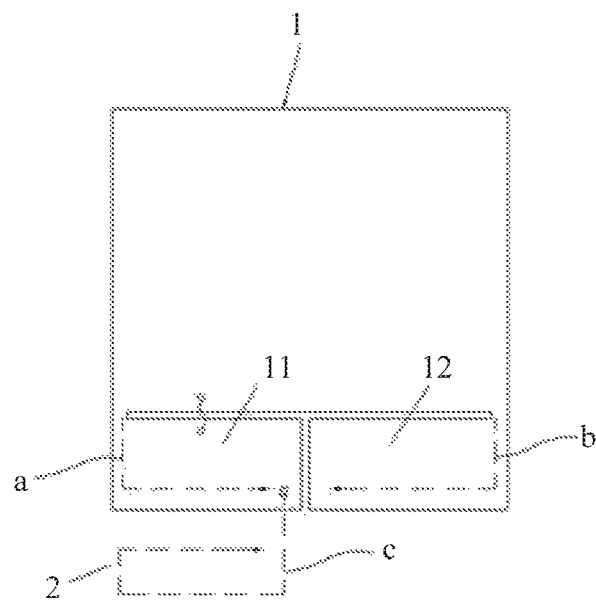
FIG. 10 is a schematic diagram of an antenna path of an antenna structure in a mobile terminal according to an embodiment of the present disclosure.

Furthermore, as shown in FIG. 3 and FIG. 4, the first slot 101, the second slot 102, and the third slot 103 form a T-shaped slot, the first slot 101 is disposed vertically, and the second slot 102 and the third slot 103 are disposed horizontally and are disposed on two sides of the first slot 101 respectively. The first slot 101, the second slot 102, and the third slot 103 may also be arranged in another manner. The second slot 102 may be symmetrical to the third slot 103, as shown in FIG. 10, or they may be not symmetrical. The first slot 101, the second slot 102, and the third slot 103 may have equal or unequal lengths and widths. The first slot 101, the second slot 102, and the third slot 103 may be in a straight line shape, or may be in an arc shape or a fold line shape or the like.

In this embodiment, as shown in FIG. 3 and FIG. 4, outline dimensions of the rear cover 13 are greater than outline dimensions of the first antenna part 11 and outline dimensions of the second antenna part 12. The outline dimensions of the rear cover 13 are relatively large, and may well serve as a grounding end of the antenna structure.

Figure 5:
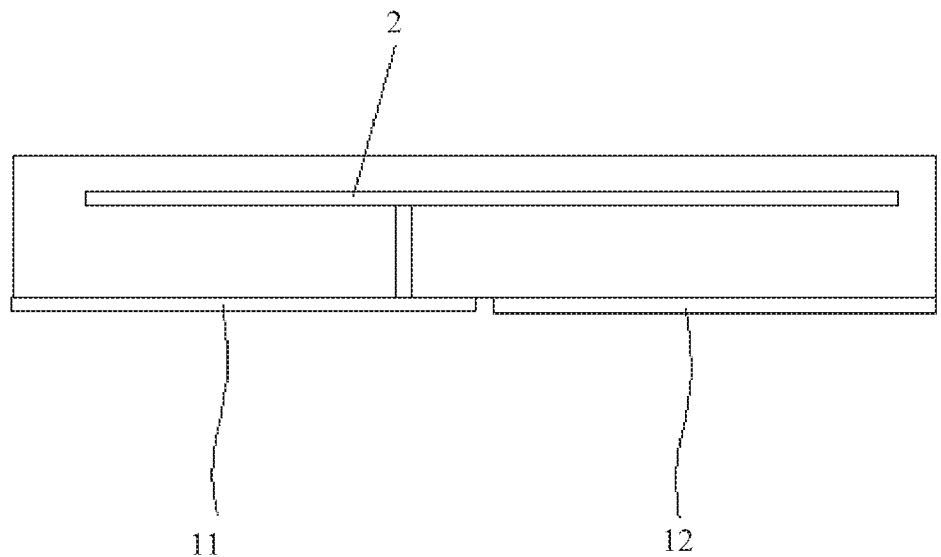
FIG. 5 is a bottom schematic diagram of a mobile terminal according to an embodiment of the present disclosure.

Furthermore, as shown in FIG. 4 and FIG. 5, where FIG. 4 is a side view of the mobile terminal in FIG. 3, and FIG. 5 is a bottom schematic diagram of the mobile terminal in FIG. 3, an antenna extension part 2 is connected to the first antenna part 11, and working characteristics of the antenna are changed by means of extension wiring. When electrical performance of the antenna needs to be adjusted, it is not necessary to make modifications on the metal rear cover 1, and only the extension wiring needs to be modified, which can significantly simplify commissioning and bring low costs of application.

Furthermore, as shown in FIG. 4 and FIG. 5, the first antenna part 11 may be connected to the antenna extension part 2 using a spring plate or an elastic ejector pin. The antenna extension part 2 may also be connected to the first antenna part 11 by means of a connector or direct welding. The elastic ejector pin is also called a Pogo-Pin (pogo pin is a spring probe formed by riveting and prepressing three basic components: a pin shaft, a spring, and a pin tube, and may be used as a precision connector applied to a terminal product such as a mobile phone).

Furthermore, as shown in FIG. 4 and FIG. 5, the antenna feed point 106 is disposed on the first antenna part 11, and one end of the antenna extension part 2 is connected to the first antenna part 11, in order to enhance the performance of the antenna. The metal rear cover 1 may be connected to a front component of the mobile phone, and a front component 4 of the mobile phone may include a front housing with a steel frame, a display screen, and the like.

Figure 6:
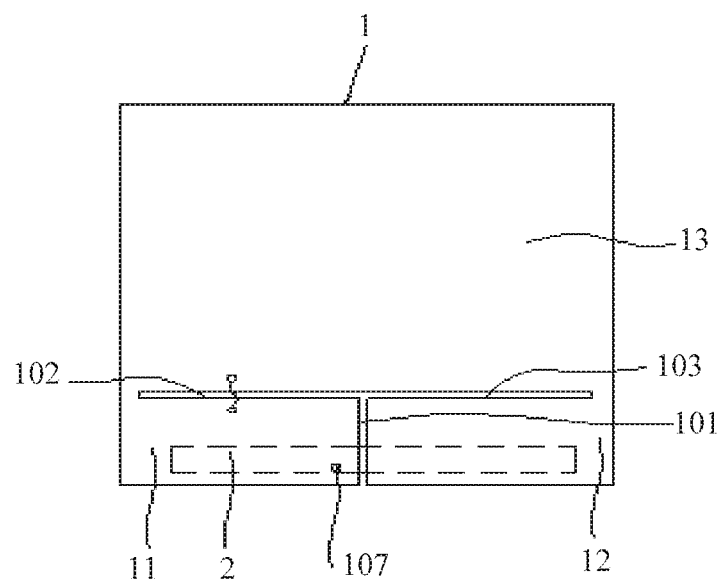
FIG. 6 is a planar schematic diagram of a mobile terminal according to an embodiment of the present disclosure.

Furthermore, as shown in FIG. 4 to FIG. 6, the antenna extension part 2 may be connected to a conductor inside the mobile terminal. The conductor may be an electronic component of the mobile terminal. The electronic component may be an appropriate part such as a conductor on a circuit board inside the mobile terminal, wiring on a flexible printed circuit (FPC), a metal plate, or conductor wiring in a laser direct structuring (LDS) component.

Figure 7:
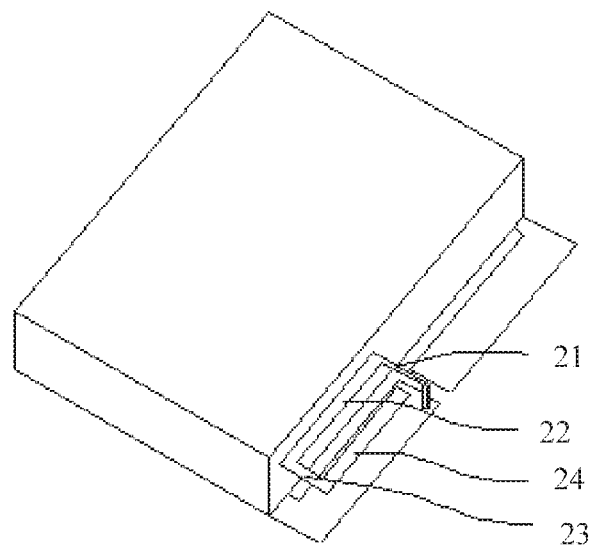
FIG. 7 is a three-dimensional schematic diagram of a mobile terminal according to an embodiment of the present disclosure.
Figure 8:
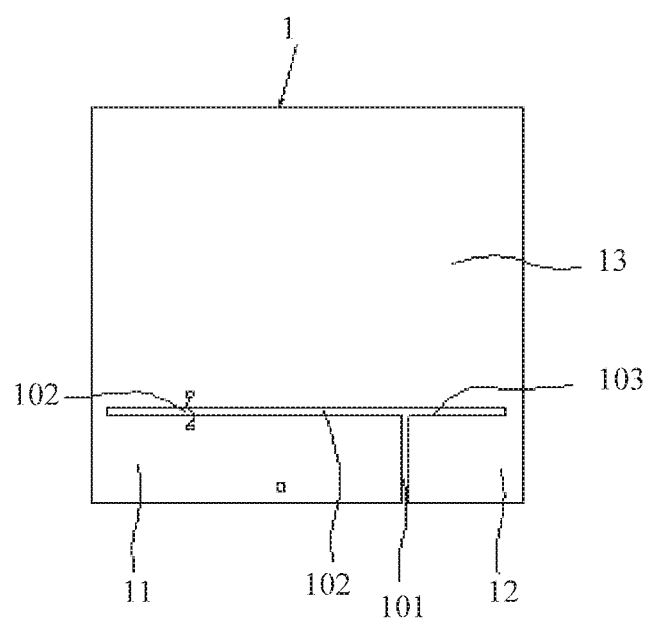
FIG. 8 is a planar schematic diagram of a mobile terminal where a second slot and a third slot in an antenna structure are not symmetrical according to an embodiment of the present disclosure.
Figure 9:
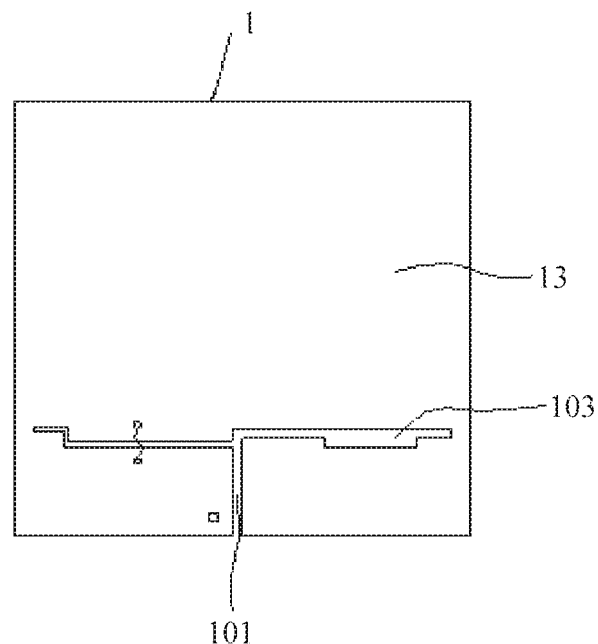
FIG. 9 is a planar schematic diagram of a mobile terminal where a second slot and a third slot in an antenna structure are not symmetrical according to an embodiment of the present disclosure.

Furthermore, as shown in FIG. 6 and FIG. 7, the first antenna part 11 has a connection point 107 near the first slot 101. A position of the connection point 107 is not limited, and may be adjusted appropriately according to an electrical performance requirement of the antenna. In a specific application, the position of the connection point 107 may also be disposed on the second antenna part 12. As shown in FIG. 6 and FIG. 7, dotted lines in FIG. 6 indicate an area in which the antenna extension part 2 is located. One end of the antenna extension part 2 is connected to the connection point 107, the antenna extension part 2 includes a first extension part 21 that extends in a direction of the rear cover 13, a second extension part 22 that extends in a direction leaving the first slot 101 from a tail end of the first extension part 21, a third extension part 23 that extends in a direction opposite to the rear cover 13 from a tail end of the second extension part 22, and a fourth extension part 24 that extends in a direction approaching the first slot 101 from a tail end of the third extension part 23. The fourth extension part 24 may be connected to a component inside the mobile terminal. In this way, the antenna extension part 2 can further improve working characteristics of the antenna structure and enhance performance of the antenna.

Understandably, a structure, a shape, and the like of the antenna extension part 2 may be set according to actual conditions.

Figure 11:
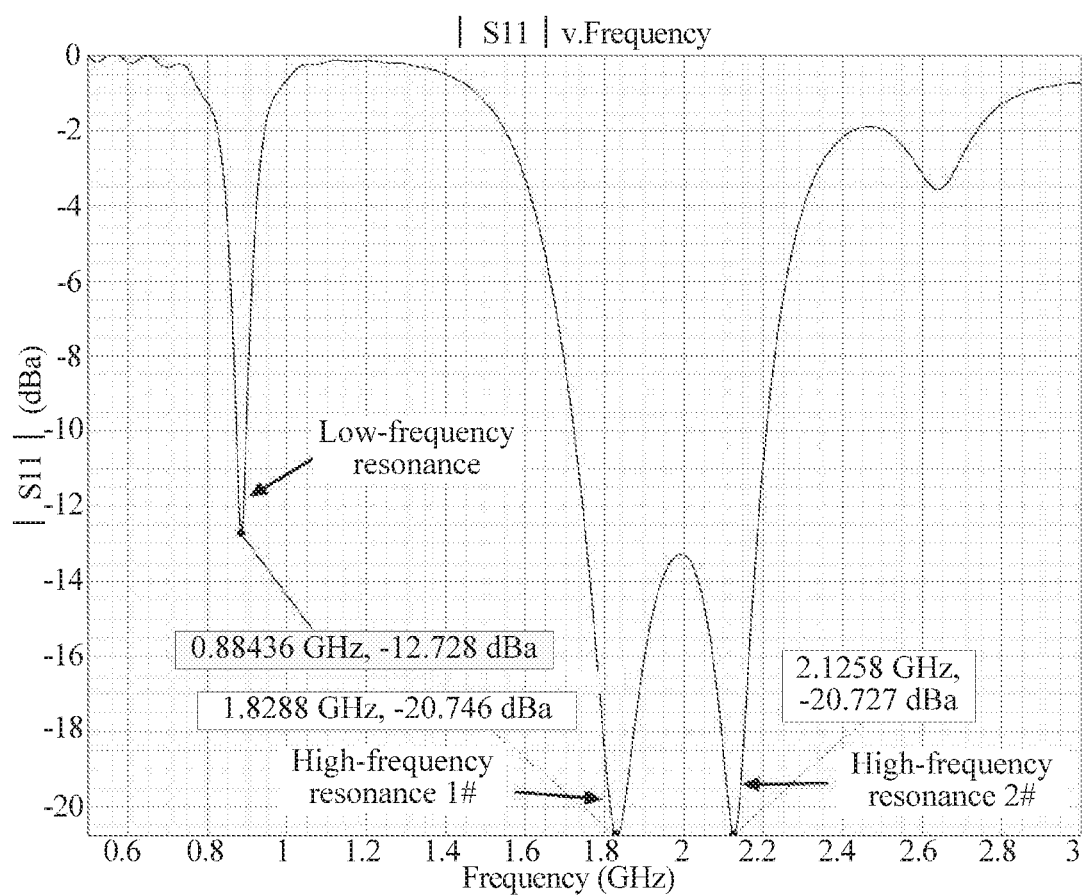
FIG. 11 is a schematic diagram of a reflection coefficient result of an antenna structure in a mobile terminal according to an embodiment of the present disclosure.

Furthermore, as shown in FIG. 3 and FIG. 10, dotted lines in FIG. 10 indicate antenna paths, where a path from the first antenna part 11 and the connection point 107 to the antenna extension part 2 is a first antenna path a. A path from a joint between the second antenna part 12 and the rear cover 13 to an opposite direction of the rear cover 13 and a direction of the first slot 101 is a second antenna path b, and an extension wiring part 2 forms a third antenna path c. A fundamental mode and a higher order mode of the first path form a low-frequency resonance and a first high-frequency resonance respectively, and space coupling exists between the second antenna path and the first antenna path. The second antenna path is equivalent to a parasitic unit, and is also excited to form a second high-frequency resonance. FIG. 11 is a schematic diagram of a reflection coefficient result of an antenna structure in a mobile terminal with a new type of antenna structure according to an embodiment. It can be seen that the antenna structure forms two high-frequency resonances at high frequencies. Therefore, wider high-frequency bandwidth can be covered.

Figure 12:
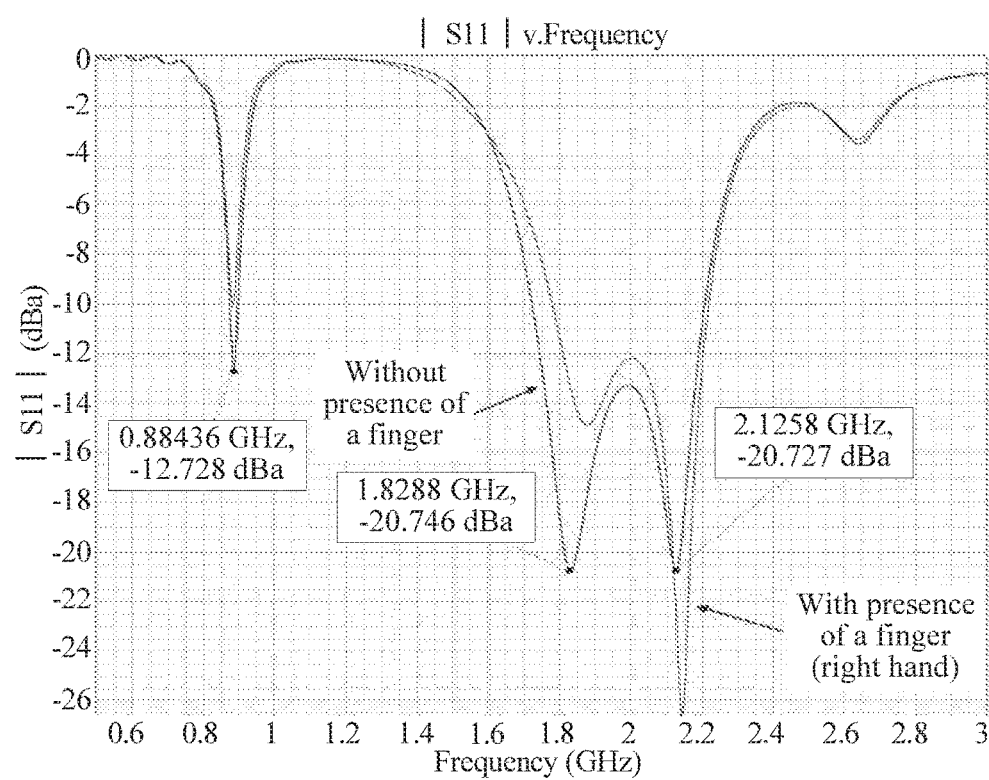
FIG. 12 is a test diagram of an antenna reflection coefficient when a right hand touches an antenna structure in a mobile terminal according to an embodiment of the present disclosure.
Figure 13:
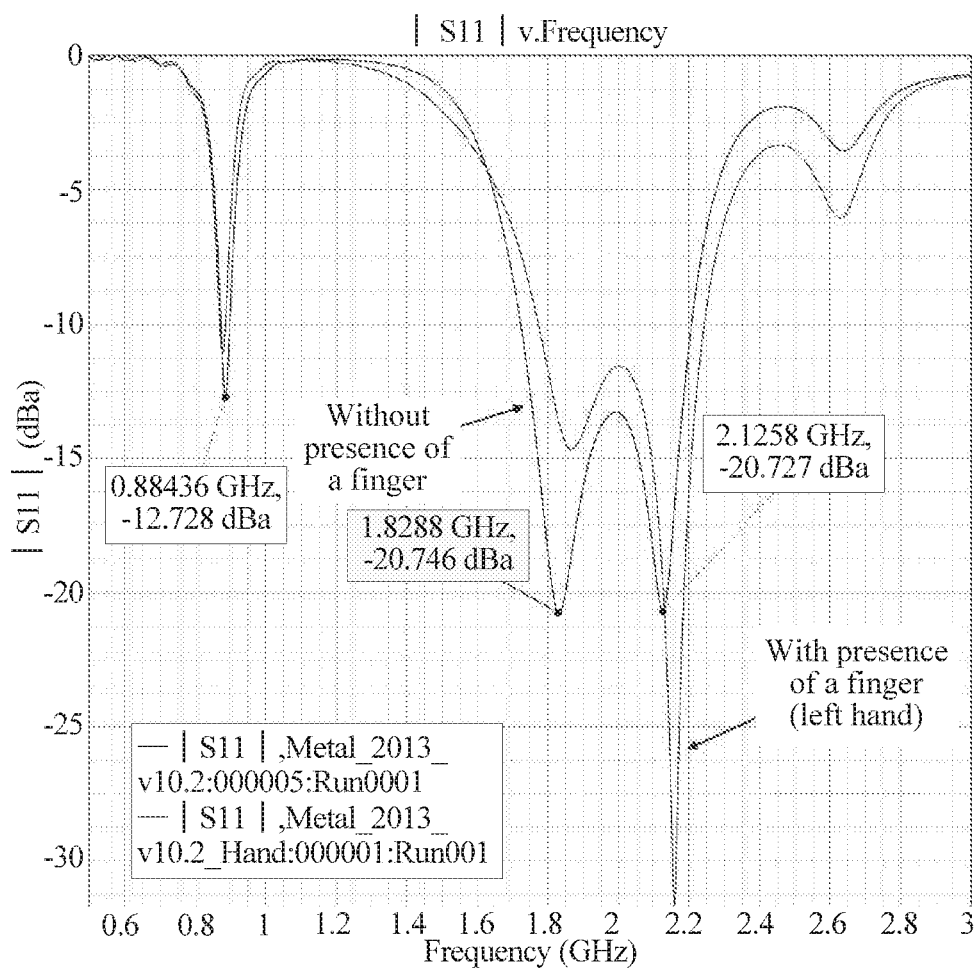
FIG. 13 is a test diagram of an antenna reflection coefficient when a left hand touches an antenna structure in a mobile terminal according to an embodiment of the present disclosure.

FIG. 12 is a test diagram of an antenna reflection coefficient when a right hand touches an antenna structure in a mobile terminal with a new type of antenna structure according to an embodiment. FIG. 13 is a test diagram of an antenna reflection coefficient when a left hand touches an antenna structure in a mobile terminal with a new type of antenna structure according to an embodiment, where little change is caused and no frequency offset problem exists.

The mobile terminal with a new type of antenna structure provided in the present disclosure brings at least the following beneficial effects.

1. The metal rear cover 1 undergoes only slotting without being split into discrete parts, and the structure is highly reliable.

2. The antenna extension part 2 is designed, and working characteristics of an antenna are changed by means of extension wiring; when electrical performance of the antenna needs to be adjusted, it is not necessary to make modifications to the metal rear cover 1, and only wiring of the antenna extension part 2 needs to be modified, which can significantly simplify commissioning and bring low costs of application.

3. By means of structural connection, wiring of the antenna is extended from the metal rear cover 1 to another component, thereby implementing extension wiring of the antenna and further reducing costs and improving antenna performance.

4. The rear cover slotting manner can effectively expand antenna bandwidth of a high frequency band.

5. An opening end of the gap on the rear cover is oriented to a bottom end face, which can significantly reduce a probability of being held by a hand, thereby reducing impact caused by the user's hand onto antenna performance.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A mobile terminal with a new type of antenna structure, wherein the antenna structure comprises:
    a metal rear cover;
    a first slot disposed on the metal rear cover, wherein a first end of the first slot connects with a lateral face or an end face of the metal rear cover;
    a second slot disposed on the metal rear cover, wherein the second slot is located on a first side of the first slot, and wherein a first end of the second slot connects with a second end of the first slot;
    a third slot disposed on the metal rear cover, wherein the third slot is located on a second side of the first slot, and wherein a first end of the third slot connects with the second end of the first slot,
    wherein the metal rear cover comprises:
        a rear cover located adjacent to a first side of the second slot and a first side of the third slot;
        a first antenna part located adjacent to the first side of the first slot and a second side of the second slot; and
        a second antenna part located adjacent to the second side of the first slot and a second side of the second slot,
        wherein both the first antenna part and the second antenna part are integrally connected to the rear cover; and
    an antenna feed point disposed on the first antenna part and/or the second antenna part, wherein the antenna feed point is connected to a transceiver of the mobile terminal using a feeder; and
    an antenna extension part connected to the first antenna part, wherein the first antenna part is connected to the antenna extension part using a spring plate or an elastic ejector pin.

2. The mobile terminal of claim 1, wherein the antenna feed point is disposed on the first antenna part, and wherein a first end of the antenna extension part is connected to the first antenna part.

3. The mobile terminal of claim 2, wherein the antenna extension part is connected to a conductor inside the mobile terminal.

4. The mobile terminal of claim 3, wherein the first end of the first slot connects with a bottom of the metal rear cover.

5. The mobile terminal of claim 3, wherein the first slot, the second slot, and the third slot form a T-shaped slot.

6. The mobile terminal of claim 3, wherein the first antenna part comprises a connection point, wherein the first end of the antenna extension part is connected to the connection point, and wherein the antenna extension part comprises:
    a first extension part that extends in a direction of the rear cover;
    a second extension part that extends in a direction leaving the first slot from a tail end of the first extension part;
    a third extension part that extends in a direction opposite to the rear cover from a tail end of the second extension part; and
    a fourth extension part that extends in a direction approaching the first slot from a tail end of the third extension part.

7. The mobile terminal of claim 6, further comprising:
    a first antenna path from the first antenna part via the connection point to the antenna extension part; and
    a second antenna path from a joint between the second antenna part and the rear cover to an opposite direction of the rear cover and a direction of the first slot,
    wherein a fundamental mode and a higher order mode of the first antenna path form a low-frequency resonance and a first high-frequency resonance respectively, wherein a space coupling exists between the second antenna path and the first antenna path, and wherein the second antenna path is excited to form a second high-frequency resonance.

8. The mobile terminal of claim 1, wherein an area of the rear cover is greater than an area of the first antenna part and an area of the second antenna part.

9. A mobile terminal with a new type of antenna structure, wherein the antenna structure comprises:
    a metal rear cover;
    a first slot disposed on the metal rear cover, wherein a first end of the first slot connects with a lateral face or an end face of the metal rear cover;

a second slot disposed on the metal rear cover wherein the second slot is located on a first side of the first slot, and wherein a first end of the second slot connects with a second end of the first slot;
a third slot disposed on the metal rear cover, wherein the third slot is located on a second side of the first slot, and wherein a first end of the third slot connects with the second end of the first slot,
wherein the metal rear cover comprises:
  a rear cover located adjacent to a first side of the second slot and a first side of the third slot;
  a first antenna part located adjacent to the first side of the first slot and a second side of the second slot, wherein the first antenna part comprises a connection point; and
  a second antenna part located adjacent to the second side of the first slot and a second side of the second slot, and
  wherein both the first antenna part and the second antenna part are integrally connected to the rear cover;
an antenna feed point disposed on the first antenna part, wherein the antenna feed point is connected to a transceiver of the mobile terminal using a feeder; and
an antenna extension part, wherein a first end of the antenna extension part is connected to the connection point, wherein the antenna extension part is connected to a conductor inside the mobile terminal, and wherein the antenna extension part comprises:
  a first extension part that extends in a direction of the rear cover;
  a second extension part that extends in a direction leaving the first slot from a tail end of the first extension part;
  a third extension part that extends in a direction opposite to the rear cover from a tail end of the second extension part; and
  a fourth extension part that extends in a direction approaching the first slot from a tail end of the third extension part.

10. The mobile terminal of claim 9, wherein the first antenna part is connected to the antenna extension part using a spring plate or an elastic ejector pin.

11. The mobile terminal of claim 9, wherein the first end of the first slot connects with a bottom of the metal rear cover.

12. The mobile terminal of claim 9, wherein the first slot, the second slot, and the third slot form a T-shaped slot.

13. The mobile terminal of claim 9, wherein an area of the rear cover is greater than an area of the first antenna part and an area of the second antenna part.

* * * * *